Aug. 21, 1962  L. MILLS  3,049,906
FLESHING MACHINE
Filed Dec. 20, 1961  2 Sheets-Sheet 1

INVENTOR.
LESTER MILLS
BY
Kimmel & Crowell
ATTORNEYS.

Aug. 21, 1962

L. MILLS 3,049,906

FLESHING MACHINE

Filed Dec. 20, 1961

INVENTOR.
LESTER MILLS
BY Kimmel & Crowell
ATTORNEYS.

United States Patent Office 3,049,906
Patented Aug. 21, 1962

3,049,906
FLESHING MACHINE
Lester Mills, Paynesville, Minn.
Filed Dec. 20, 1961, Ser. No. 160,735
4 Claims. (Cl. 69—46)

This invention relates to a fleshing machine, and more particularly to such a device adapted for removing the flesh from the pelts of small animals such as mink or the like.

The invention constitutes an improvement over the prior patent of A. N. Henfling, dated June 21, 1960, No. 2,941,391.

A primary object of the invention is the provision of an improved fleshing machine of this character having spring biased means for constantly urging an oscillating fleshing knife or blade into engagement with the pelt to be fleshed.

A further important object of the invention is the provision of a blower or fan and an air duct leading to a nozzle immediately adjacent the blade for blowing the fat and grease removed from the pelt back on the knife which then runs down into an associated grease pan leaving the pelt and fur free of grease and ready for the board for further treatment.

An additional object of the invention is the provision of a device of this character including tilting table means upon which the oscillating knife is mounted, which may be readily tilted to disengage the knife from the pelt at any time.

Still other objects reside in the combinations of elements, arrangements of parts, and features of construction, all as will be more fully pointed out hereinafter and disclosed in the accompanying drawings wherein.

Similar reference characters refer to similar parts throughout the several views of the drawing.

Figure 1:
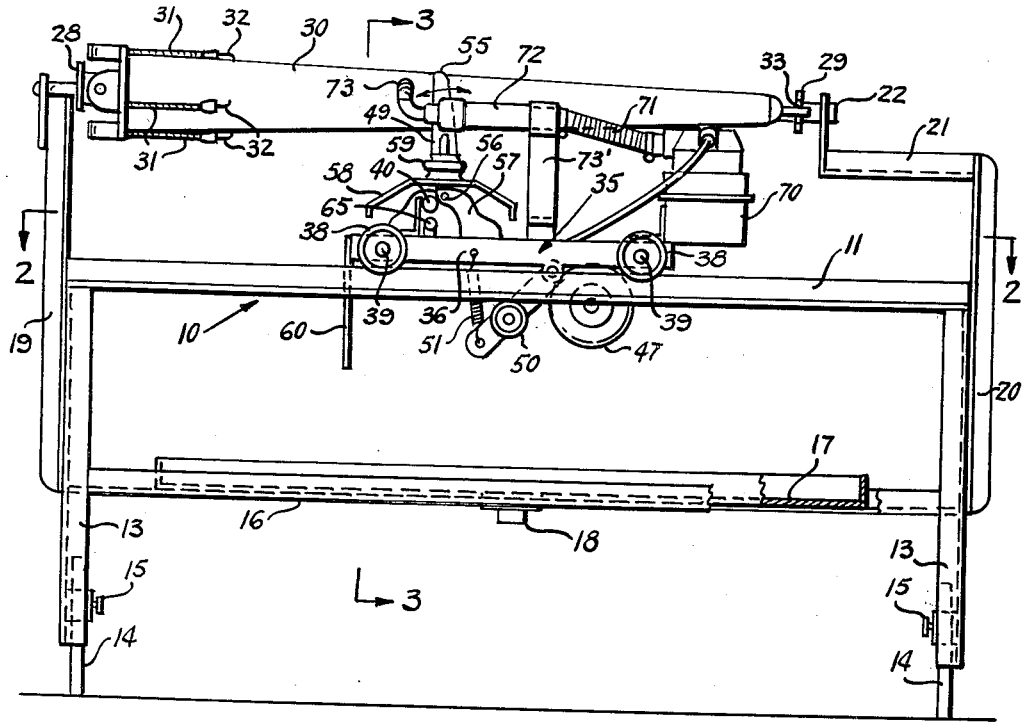
FIGURE 1 is a side elevational view of a fleshing machine constructed in accordance with the instant invention.
Figure 2:
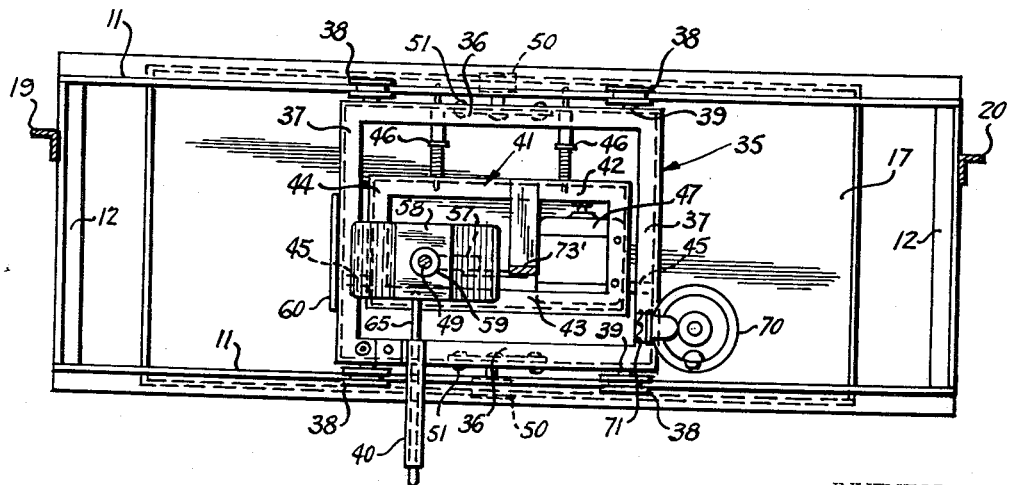
FIGURE 2 is a sectional view taken substantially along the line 2—2 of FIG. 1 as viewed in the direction indicated by the arrows.

Having reference now to the drawings in detail, there is generally indicated at 10 a supporting frame, which comprises a pair of upper angle irons 11 extending longitudinally of the machine in spaced relation, and forming rails, for a purpose to be more fully described hereinafter, connected by end pieces 12. The frame is supported on legs 13 at each corner thereof, the legs being provided with extensions 14 held in position by means of set screw members 15 for adjusting the frame to any desired height.

A lower frame comprises a pair of side portions 16 connected by end members (not shown) similar to the members 12. The frame members 16 support a grease or drip pan 17 which has a funnel-shaped bottom and a centrally located opening 18 which may be positioned over a receptacle for catching any drainage therefrom.

Uprights 19 and 20 extend vertically from opposite ends of the frame 10, the upright 20 including an inwardly offset portion 21 and have rotatably extending between their upper extremities a fleshing pole shaft 22. Transversely extending plates 28 and 29 carry a pair of tapered conical fleshing spindles 30, the larger end of each of which is provided with resilient retractor members 31 terminating in pelt engaging clips or hooks 32. The ends of each of plates 29 and 28 are provided with V-shaped indentations 33 by means of which the fleshing spindles may be readily removed for the positioning of pelts thereon. The upper extremities of each of the uprights 19 and 20 also carry recesses 34 tapered at their upper extremities inwardly, so that the fleshing pole and its associated mechanism may be removed in its entirety, if desired.

A carriage, generally indicated at 35, is comprised of side members 36 and end pieces 37. Grooved rollers 38 mounted on stub axles 39 permit linear movement of the carriage 35 along the rails 11. A handle 40 is secured to the frame 35 to permit manual linear movement thereof along the tracks 11.

Positioned interiorly of frame 35 is a second frame generally indicated at 41 and comprised of a first side member 42, an opposite side member 43, and end members 44. The side member 42 is parallel to, and spaced from, the adjacent side member 36 of the frame 35. The frame 41 is pivotally mounted by means of pivots 45 to the end members 37 of frame 35. Compression spring members 46 extend between member 42 and its adjacent frame member 36 for the purpose of tilting the frame in a direction towards the fleshing spindle 30 immediately adjacent thereto, for reasons to be more fully described hereinafter.

An electric motor 47 is dependingly secured to the underside of frame 41, and drives, through a belt and pulley arrangement, a cam assembly, generally indicated at 48, which oscillates a pivoted blade carrying arm 49. The cam arrangement is fully described in the above-mentioned Patent No. 2,941,391 and forms no part of the instant invention.

Rollers 50 secured by springs 51 to frame members 36 serve to hold the frame 35 in related assembly with the tracks 11. This arrangement is also shown in detail in Patent No. 2,941,391.

The knife carrying arm 49 carries an oscillating scraper blade or knife 55, which is detachably secured thereto by means of bolts 56 so as to permit ready replacement when it becomes dull. The knife 55 oscillates in an arc in the direction indicated by the arcuate arrow in FIG. 1, and is pivotally mounted as on a pivot, not shown, carried by an arm 57 secured to the inner frame 41. The knife carrying arm 49 extends through a deflector plate 58 and a flexible sealing member 59 which precludes any fat or grease from the pelt being fleshed from falling into the mechanism. A skirt 60 is also provided adjacent the end of the frame and depends from the member 37 to serve as a further shield to guide fat and grease into the pan 17.

Figure 4:
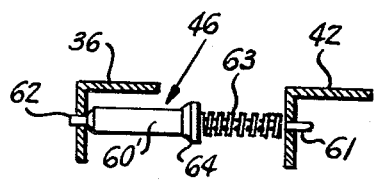
FIGURE 4 is a fragmentary enlarged view partially in section and partially in elevation disclosing a constructional detail.

Referring back to the spring members 46 and more particularly to FIG. 4, it will be seen that each is comprised of a cylindrical member 60' having a stem 61 extending therefrom and a stud 62 at its other end. The stud 62 extends through a suitable opening in the frame member 36 while the end of the pin 61 extends through an aligned opening in the frame member 41. A compression spring 63 surrounds the pin 61 and seats at one end against a flange 64 formed on the cylindrical member 60' and at its other end abuts the member 42 in such manner as to tilt the entire frame 41 in a direction to bias the knife 55 toward the pelt carried by the adjacent spindle 30.

A handle 65 is secured to a bracket 66 carried by the inner frame 41 and may be employed to tilt the frame 41 in a direction to move the blade away from the pelt when desired.

A fan or blower 70 is also carried by the frame 35 and driven by a self contained motor to force air through a flexible conduit 71 into a tube 72 and thence through a nozzle 73 immediately in advance of the blade 55 so that fat and grease removed from the pelt may be blown onto the knife, and thence fall to the shield 58 and ultimately to the trough 17. A suitable support 73' is carried by the frame 41 and tilts therewith so that the nozzle 73 moves with the knife 55.

Figure 3:
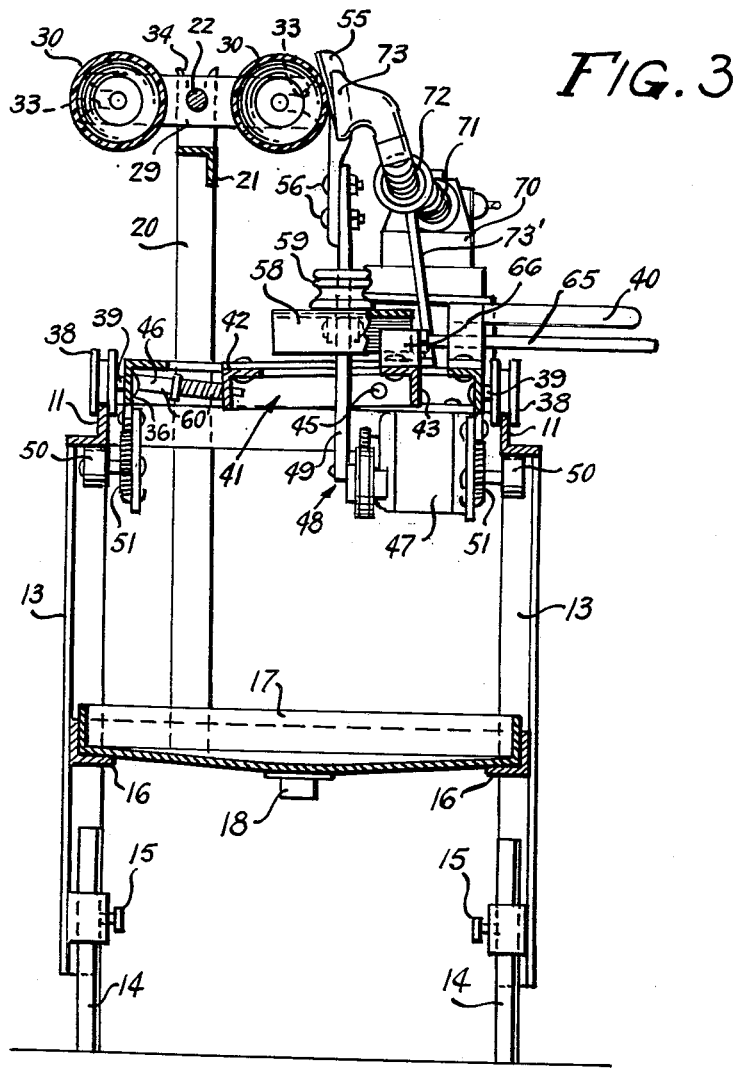
FIGURE 3 is an enlarged sectional view taken substantially along the line 3—3 of FIG. 1 as viewed in the direction indicated by the arrows.

From the foregoing the operation of the device should now be readily understandable. A pelt to be fleshed is positioned on each of the spindles 30 and secured firmly thereon by means of the clamps or hooks 32. The frame 35 is then manually moved toward the reduced end of the spindle, and the motor 47 actuated to reciprocate the knife 55 and at the same time actuate the blower or fan 70. The entire assembly is then moved by means of a handle 40 toward the larger end of the spindle, and the pelt associated therewith, the spindle meanwhile being manually rotated in order that all portions of the pelt may be completely fleshed. The fat and grease removed from the pelt by the knife 55 is blown toward the blade 55 and then drops or falls toward the deflector 58 and into the tough 17 from which it may be removed. The arrangement of the two spindles as shown in FIG. 3 permits two pelts to be mounted before disassembly of the spindles and fleshing pole, merely by moving one spindle in the position adjacent the knife 55 and then when the pelt mounted thereon has been fleshed rotating the entire assembly about the fleshing post 22 to juxtapose the other spindle and its associated pelt to the knife.

By virtue of the spring arrangement 46 previously described, the reciprocating knife is held constantly in engagement with the pelt to be fleshed unless manually moved by the handle 65, and a constant stream of air is blown over the pelt to permit any grease, fat or flesh removed therefrom to drop into the receptacle 17 provided therefor.

From the foregoing it will now be seen that there is herein provided an improved fleshing machine which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. In a fleshing machine, in combination, a supporting frame, an upright extending above each end of said frame, a fleshing pole extending between said uprights, a spindle adapted for the reception of a pelt to be fleshed carried by said fleshing pole, a pair of tracks carried by the top of said frame extending in parallelism to said pole, a wheeled carriage having an open top forming an outer frame mounted on said tracks for longitudinal movement therealong, an inner frame pivotally mounted in said outer frame, an oscillating knife supporting arm carried by said inner frame, motor means dependingly secured to said inner frame for reciprocating said knife supporting arm, a fleshing knife detachably secured to the upper end of said knife supporting arm, and spring means positioned between said inner and outer frame tilting said inner frame in a direction to bias said fleshing knife into engagement with a pelt carried by said spindle.

2. In a fleshing machine, in combination, a supporting frame, an upright extending above each end of said frame, a fleshing pole extending between said uprights, a spindle adapted for the reception of a pelt to be fleshed carried by said fleshing pole, a pair of tracks carried by the top of said frame extending in parallelism to said pole, a wheeled carriage having an open top forming an outer frame mounted on said tracks for longitudinal movement therealong, an inner frame pivotally mounted in said outer frame, an oscillating knife supporting arm carried by said inner frame, motor means dependingly secured to said inner frame for reciprocating said knife supporting arm, a fleshing knife detachably secured to the upper end of said knife supporting arm, and spring means positioned between said inner and outer frame tilting said inner frame in a direction to bias said fleshing knife into engagement with a pelt carried by said spindle, a blower carried by said outer frame, a flexible air duct connected to said blower, a rigid air duct carried by said inner frame communicating with said flexible duct, and a nozzle communicating with said rigid duct adjacent said fleshing knife.

3. The structure of claim 2 wherein said supporting frame carries a refuse tray below said tracks extending substantially the entire length thereof and a refuse deflecting shield is carried by said knife supporting arm.

4. The structure of claim 2 wherein said spring means comprise cylindrical members having a stud at one end extending into an opening in said outer frame and a pin at the other end extending into an opening in said inner frame, a flange on said stud at its juncture with said pin, and a compression spring on said pin extending between said flange and said inner frame.

References Cited in the file of this patent

UNITED STATES PATENTS

| | | |
|---|---|---|
| 2,896,438 | Larsson | July 28, 1959 |
| 2,910,856 | Fredrickson | Nov. 3, 1959 |
| 2,941,391 | Henfling | June 21, 1960 |
| 2,942,448 | Jonas | June 28, 1960 |